United States Patent [19]

Schnee

[11] 4,204,466
[45] May 27, 1980

[54] PLANT FOR THE AUTOMATIC PRODUCTION OF ARABIC FLAT BREAD

[75] Inventor: Walter Schnee, Villingen, Fed. Rep. of Germany

[73] Assignee: Fr. Winkler KG, Villingen, Fed. Rep. of Germany

[21] Appl. No.: 962,296

[22] Filed: Nov. 20, 1978

[30] Foreign Application Priority Data

Nov. 24, 1977 [DE] Fed. Rep. of Germany ....... 2752464

[51] Int. Cl.² .............................................. A21B 7/00
[52] U.S. Cl. ................................ 99/443 C; 99/352; 99/353; 198/424
[58] Field of Search .................... 99/352, 353, 443 C, 99/450.1, 450.2; 198/424, 484, 796; 426/549

[56] References Cited

U.S. PATENT DOCUMENTS

| | | | |
|---|---|---|---|
| 1,291,844 | 1/1919 | Green | 198/424 |
| 1,782,327 | 11/1930 | Vicars | 198/424 |
| 3,106,280 | 10/1963 | Baker | 198/424 X |
| 3,146,730 | 9/1964 | White | 99/353 X |
| 3,295,434 | 1/1967 | Wilhelm et al. | 99/443 C X |
| 3,324,987 | 6/1967 | Kiesser | 198/424 X |
| 3,354,613 | 11/1967 | Anderson et al. | 198/484 X |
| 3,502,020 | 3/1970 | Bressickello | 99/443 C |
| 3,603,271 | 9/1971 | Remensperger et al. | 198/796 X |
| 3,803,326 | 4/1974 | Craig et al. | 426/549 X |
| 4,109,569 | 8/1978 | Kemper | 99/443 C X |

*Primary Examiner*—Harvey C. Hornsby
*Assistant Examiner*—Arthur O. Henderson
*Attorney, Agent, or Firm*—Stoll and Stoll

[57] ABSTRACT

A plant for the automatic production of Arabic flat bread is provided. It consists basically of a sequence of devices or arrangements for performing the following functions: dough portioning, dough kneading and forming, prefermentation, dough rolling into flats, final fermentation, and finally baking. In accordance with the present invention such a plant is primarily characterized by swingably suspended trays having a bran layer on top for carrying the flat pieces during final fermentation passing through the final fermentation housing in a serpentine path.

21 Claims, 7 Drawing Figures

PLANT FOR THE AUTOMATIC PRODUCTION OF ARABIC FLAT BREAD

REFERENCE TO RELATED APPLICATION

This application corresponds to patent application No. P 27 52 464.7 filed Nov. 24, 1977 in the Federal Republic of Germany, as to which priority is claimed pursuant to law.

BACKGROUND OF THE INVENTION

Processes and plants for automatic manufacturing of Middle-European types of bread are known in many variations. As a rule, they are basically constituted of a dough portioning machine, a kneader, diverse dough working arrangements, a fermentation housing and finally a baking oven.

These plants are not suited, without modification, for the automatic working a processing of the dough necessary for Arabic flat bread. The latter has a relatively high water content (100 kg. flour need 70 to 75 l. water), and the handling and treatment of the flat-formed dough becomes problematic.

Particularly problematic is the storage and transportation of the flat shaped dough pieces in the final fermentation housing. Due to their shape, the dough pieces cannot be laid on conventional hangers. The latter are replaced by serpentine guided conveyor belts. However, at the end of each such belt the dough pieces are turned over in the process of being delivered to the start of the lower lying belt. Such method of processing cannot be practiced for two reasons. On the one hand the above-mentioned high water consistency causes a stretching of the dough cuts in the direction of transport at every turnover point. This is undesirable due to the necessity of circular flats. On the other hand, such method of handling would result in flat bread with identical lower and upper surfaces. This is not characteristic of Arabic flat bread and is undesirable.

This drawback might in principle be avoidable by providing, at the end of each belt, an uptake arrangement to carefully receive the dough pieces and deliver them to the lower belt without turning them over but having 20 band belt sections stacked one on top of the other would require 20 such uptake arrangements. This would be an extraordinary complexity causing frequent breakdown and repair.

SUMMARY OF THE INVENTION

The present application has, therefore, as its object the provision of a plant for the production of Arabic bread, which, although simply conceived and most importantly has infrequent outage (downtime), is suited to produce flat bread that is not clearly and immediately distinguishable from the conventional, mostly manually produced, flat bread. Such plant is based on already known processing techniques for automatically making Middle-European bread types, but utilizing Arabic baking techniques.

Briefly, and not by way of limitation, dough pieces delivered from the dough portioning machine are formed into dough-balls by a plurality of oscillating kneading cups. The dough-balls are then prefermented in a prefermentation housing, after which they are rolled flat into flat-shaped pieces with a rolling machine, the latter generally known in the art. The flat-shaped dough pieces are then layed onto dough carriers in a final fermentation housing, which is followed by a baking oven. The oven is preferably of the type having a continuous netted belt-conveyor.

The initially posed object of the invention is attained by utilizing fermentation trays having a continuously bordered flat surface as dough carriers, which are filled to the brim with bran, and which are suspended in a well known manner to swing in two directions. These carriers are suspended from conveyor chains that move in serpentine manner through the final fermentation housing.

The bran layers in the fermentation trays permit the dough flat to remain unturned during its movement through the fermentation housing in spite of the long duration of almost one hour. The bran absorbs water from the dough flats as well as prevents them from being damaged during handling.

Due to the swinging suspension of the fermentation trays, complicated uptake mechanisms within the fermentation housing were dispensed with.

A known transfer mechanism is used between the rolling machine and the final fermentation housing for the transport of the dough flats. It consists of a continuous delivery belt, which is a fast reciprocating tongue-shaped belt positioned immediately above the fermentation trays.

Following the final fermentation housing is a continuous takeup belt, again tongue-shaped at its end, which reaches under the dough flats on fermentation trays and picks them up. In order to facilitate the pick-up operation, the trays are forcibly tilted at the pick-up station. The dough flats are then delivered to the baking oven.

The pick-up operation is further assisted by an intransfer direction rotating cylindrical brush which is nearly evenly positioned, preferably adjustably, with the dough flat at the pick-up station above the tip of the belt tongue. The rotating brush prevents the flats from being thrown upwards during pick-up, in addition to brushing off any bran on the top surface.

In order to brush the bottom surface free from bran, there is, between the pick-up belt and a following conveyor belt feeding the oven, at least one oscillating row of brushes in the belt plane oscillating transversely to the transport direction. It is appropriate to have a number of oppositely oscillating or rotating rows of brushes, such that the transversal forces on the flats cancel each other.

While the bran sticking to the flats does not cause damage, it is preferable to remove it, especially from the underside, where it causes visually unpleasing black spots.

In fully automatic operation, it is necessary to constantly refill or replenish the bran bed in the fermentation trays. Such purpose is satisfied through a filling station on the final fermentation housing. It comprises a bran depot having a funnel positioned above a tray to be filled and followed by an evening (leveling) bar. In the muzzle of the funnel there is a dispenser mechanism controlled by the tray drive. The control of such dispenser may, in accordance with another aspect of the present invention, be activated by a cam disc driven by the conveyor chains, whereby the cam disc activates a controlling switch, and whereby the adjustable cam profile determines where the point of dispensation begins, its duration and the quantity dispensed.

Further technical details of a plant according to the present invention, protected by the attached claims, will be better understood by means of the following detailed description of a preferred embodiment in conjunction with the accompanying drawing.

DESCRIPTION OF A PREFERRED EMBODIMENT

Figure 1:
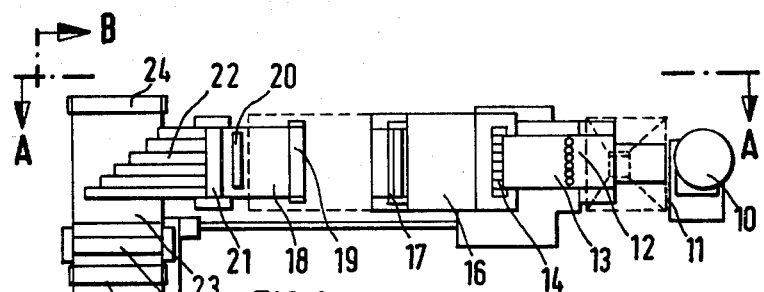
FIG. 1 is a plan view of an embodiment of the plant according to the present invention.
Figure 2:
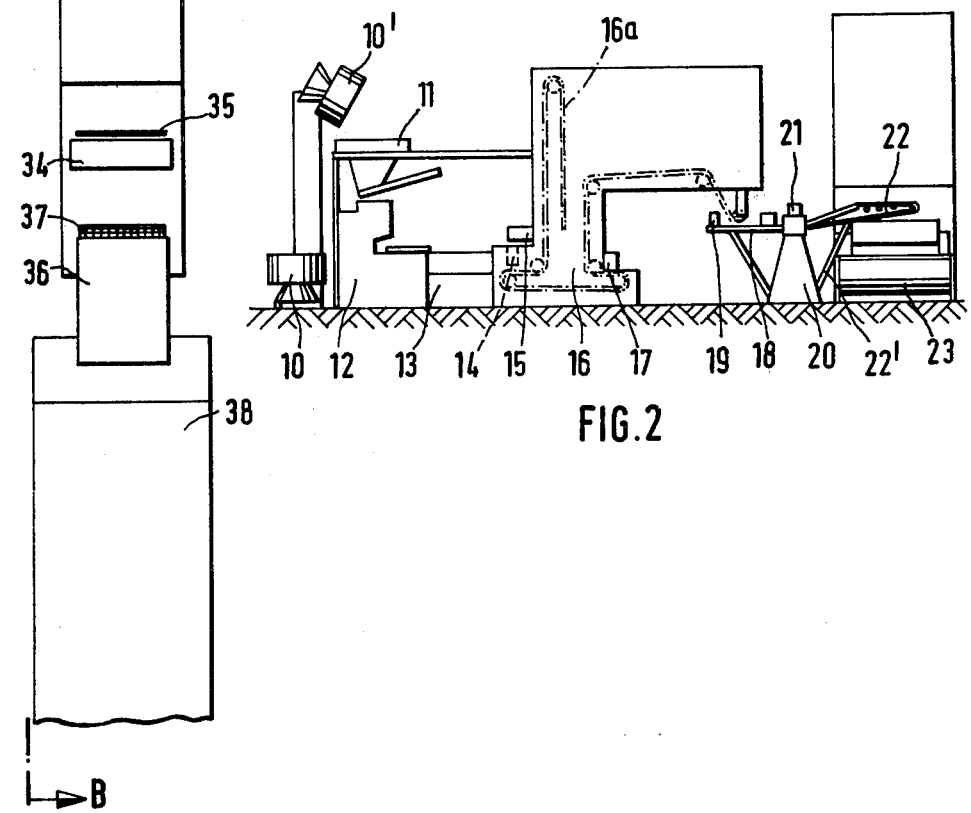
FIG. 2 is an elevational view of the plant in the direction A—A in FIG. 1.

Referring to the drawing, the plan view in FIG. 1 shows the overall construction of the baking plant. Therein, the basic components, one after the other according to sequential function, together with the appropriate reference numerals, are:

10 Raisable and tiltable dough tub in loading position;
10 dough tub as in 10 in discharge position;
11 arrangement for automatic dough supply;
12 kneading arrangement for production of dough balls;
13 conveyor belt;
14 distribution funnel;
15 flouring applicator;
16 prefermentation housing with swingable fermentation trays suspended from conveyor chains (16a);
17 flour applicator;
18 conveyor belt;
19 flour applicator;
20 dough flattening device;
21 flour applicator;
22 stepped conveyor belts of differing lengths;
23, 24–26 flour applicators;
27 rolling device;
28 height adjustable conveyor belt;
29 pick-up arrangement, 29a pick-up belt;
30 final fermentation housing;
31 conveyor chains;
32 chain drive gears;
33 chain guiding gears;
34 bran depot;
34a portioning arrangement;
35 evening bar;
36a take-up belt tongue;
36b put-up belt tongue;
37 rotating cylindrical brush;
38 steel plate oven;
39 dough piece;
40 fermentation trays;
40a surface of fermentation trays;
40b border of fermentation trays;
40c bran layer;
41 supply belt;
42a, 42b brush rows.

The automatic baking plant of the present invention operates as hereunder detailed.

The raiseable and tiltable dough tub 10 is loaded with dough, the latter having been prepared in flour and dough preparation machines not to be discussed herein. The dough is supplied to a kneading machine 12 through supply and portioning arrangements. The kneading machine 12 makes spherical pieces from the dough portions by means of kneading cups or rings. The pieces are then transported in rows on a conveyor belt 13 to the prefermentation housing 16. The latter has fermentation trays swingably suspended from chains 16a, which are loaded with dough pieces from distribution funnel 14. Before such loading onto the trays (not shown) flour 13 is sprayed on the dough pieces by means of flour applicator 15. Similarly, the trays (partly spherical in shape) are sprayed with bran by means of flour applicator 17, thereby preventing the dough pieces from becoming stuck to the trays during fermentation.

The dough carrying trays are tilted above the conveyor belt 18 such that the dough pieces fall onto the belt 18. The belt 18 also is sprayed with bran by means of flour applicator 19, and transports the dough pieces to a first rolling device, which flattens the spherical pieces into flats. The rollers are sprayed by means of flour applicator 21 to prevent sticking.

The following stepped conveyor belts 22 transport the now flat-formed dough pieces onto conveyor belt 23, which is perpendicular to the previous transport direction. The stepped conveyor belts 22 are adjustable in height by means of telescopic extendable supports 22', such that the dough flats are overturned prior to being layed onto the conveyor belt 23. Because the neighboring conveyor belts 22 are stepped in length, the dough pieces are layed on the conveyor belt 23 in rows. The conveyor belt 23 also is sprayed with bran by means of a flour applicator 24. The final thickness of the flats is determined by two rolling devices 27 to which flour applicators 25 and 26 are assigned. The formed dough flats now reach the pick-up arrangement 29 via the conveyor belt 28. The height of the latter also is adjustable by means of telescopic supports 28', such that the flats are overturned as they are layed on the pick-up arrangement 29, which means they have been turned over twice. The pick-up belt 29a is stationary during the laying of flats, such that the separation between the flats, resulting from stepped belts 22, is removed. As a fermentation tray in the final fermentation housing 30 comes under the belt 29a of the pick-up arrangement 29 the belt is withdrawn so that the dough pieces fall into the fermentation trays 40.

Figure 5:
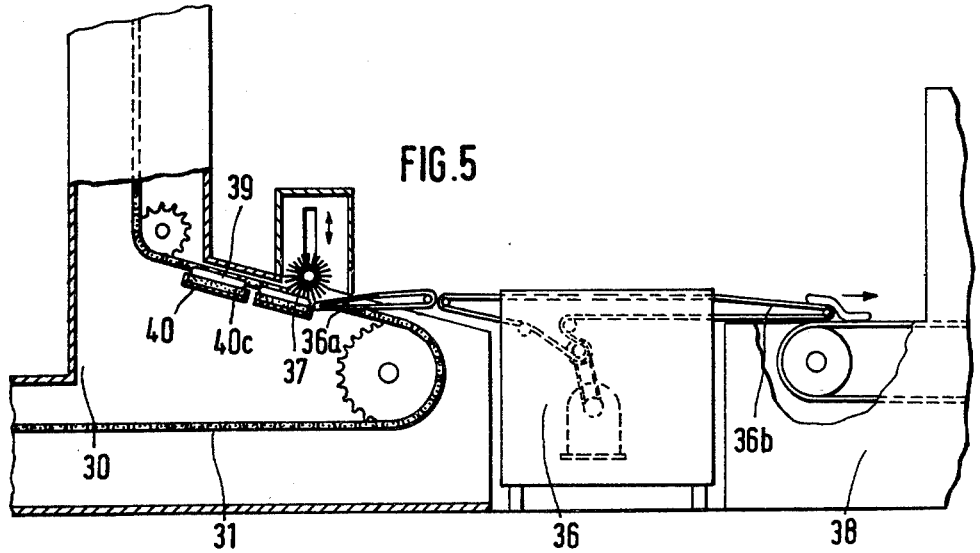
FIG. 5 is an enlarged view of the transfer mechanism at the end of the final fermentation housing according to detail D in FIG. 3.

The construction of the fermentation trays 4 is illustrated in FIGS. 5 and particularly 7. They consist of a carrier 40 having a double-T cross-section out of wood, plastic or metal and having a surface 40a and a continuous border 40b. The space up to the brim is filled with a layer of bran, on which lies the dough piece 39.

Figure 3:
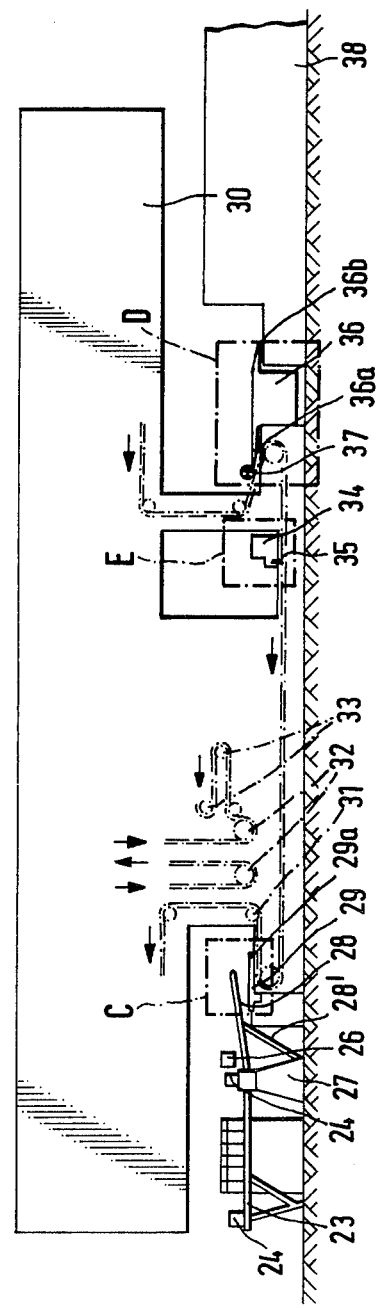
FIG. 3 is an elevational view of the plant in the direction B—B in FIG. 1.
Figure 4:
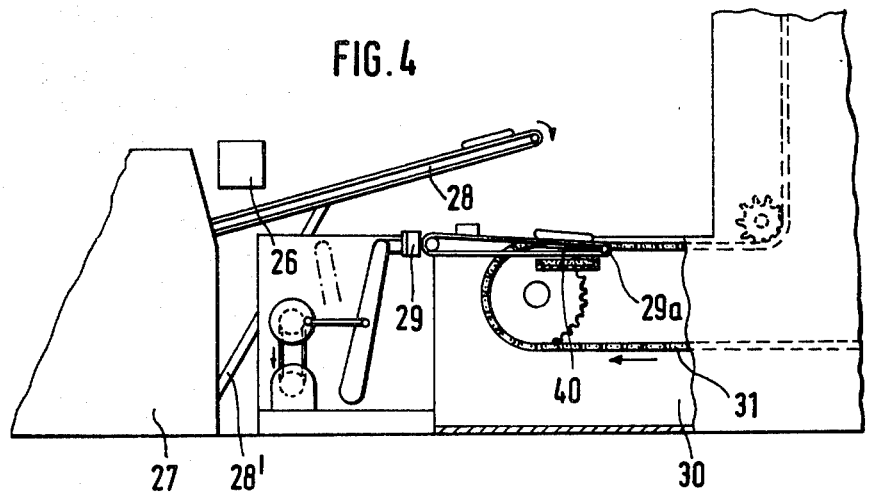
FIG. 4 is an enlarged view of the pick-up mechanism in the regions of the final fermentation housing according to detail C in FIG. 3.

The occupied fermentation trays move through the final fermentation housing 30 suspended from the conveyor chains 31 in the direction of the arrow in FIG. 3. The conveyor chains 31 are driven via chain-wheels 32 and are guided by wheels 33 such that they move through the housing in a serpentine path. The wheels 32 are adjacent one another although functionally they have a chain distance between them of half a chain length, thereby guaranteeing a jitter-free operation.

After a duration of 40 to 60 minutes, the fermentation trays approach the discharge station, illustrated in FIG. 5, at which point the trays are tilted toward the jutting belt-tongue 36a, such that the rotating belt of the arrangement 36 picks up the dough pieces. A cylindrical brush 37 prevents the dough pieces from being thrown upwards by pick-up, it also ensures a surface brushing of the dough flats. From the end 36b of the conveyance arrangement 36 in FIG. 3 the dough flats reach the conveyor belt (not shown) of a baking oven 38.

Figure 7:
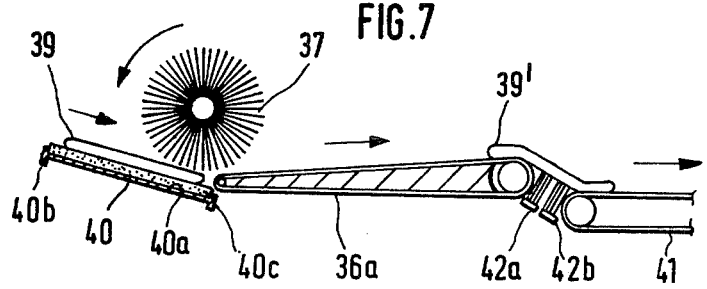
FIG. 7 is an enlarged view of an alternative embodiment of a transfer arrangement like that in FIG. 5.

In order to permit the bran stuck to the underside of the flats 39 to fall off, the belts of the arrangement 36 are netted. It may also be appropriate to have them vibrating, and, should that move still be insufficient, there is shown in FIG. 7 rows 42a and 42b of brushes between the belt 36a and another 41 leading into the oven. The brush rows 42a and 42b would oscillate or rotate opposite one another perpendicular to the transport direction. Preferably there is a plurality of brush rows, so that the dough pieces 39' are not subjected to transversal or rotational forces.

Figure 6:
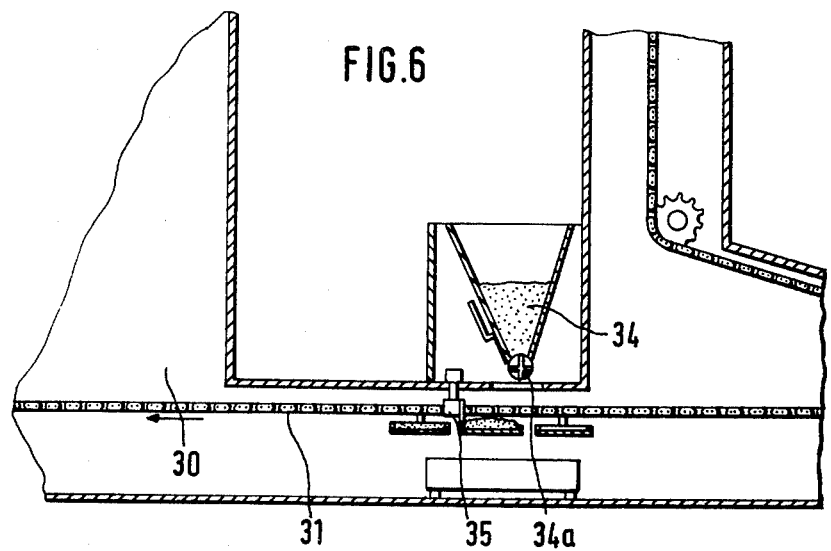
FIG. 6 is an enlarged view of the bran depot and evening bar in the final fermentation housing according to detail E in FIG. 3.

Since during pick-up of the flats by the arrangement 36 some bran is lost from the layer in each tray, it is necessary to replenish the bran and even the surface anew. The controlled bran depot 34, followed by evening bar 25, fulfills this function. This arrangement may be seen in FIG. 6.

The bran depot, which may be loaded with bran automatically or manually, is constructed in the form of a funnel. At its dispensing end there is a portioning device 34a, which is a cylinder having four measuring chambers and which occupies the whole aperture. The cylinder rotates following the advance of the fermentation trays such that a predetermined quantity of bran falls onto a fermentation tray, whenever the latter is under the funnel aperture. The time of dispensing of bran may be determined by means of a cam disc, which is driven by the drive chains 32 in the final fermentation housing 30. By choosing the volume in the chambers of the cylinder and its turning speed, the quantity and duration of dispensing of bran are determined.

While the foregoing is illustrative of a preferred embodiments of the invention, other embodiments and modifications may be had within the teachings and scope hereof.

What is claimed is:

1. A plant for the automatic production of Arabic flat bread, comprising a dough portioning machine, a kneading arrangement for forming ball-like dough pieces, a prefermentation housing, at least a rolling device for making substantially flat dough pieces, a final fermentation housing comprising carriers for supporting said dough pieces, and a baking oven, characterized in that the carriers are fermentation trays having an even surface and a continuous border, said fermentation trays being filled to the brim with bran and being suspended to freely swing in two directions from endless conveyor means that move through said fermentation housing in a serpentine path, and further comprising transfer belt means and guide means, said transfer belt means comprising a substantially tongue-shaped tip for reaching under the dough pieces lying on said bran in said fermentation trays, said fermentation trays being tilted toward said tongue-shaped tip at least in part by said guide means.

2. A plant in accordance with claim 1, additionally comprising loading means for the loading of said fermentation trays, said loading means comprising a continuous belt with a substantially tongue-shaped tip ending above and adjacent said fermentation trays, and withdrawing means for quickly withdrawing said tip from adjacent said fermentation trays.

3. A plant in accordance with claim 2, wherein said continuous belt comprises means for briefly stopping when receiving dough pieces and for control such that when one of said fermentation trays approaches said continuous belt it is quickly withdrawn in order to load said fermentation tray with a dough piece.

4. A plant in accordance with claim 2, additionally comprising stop means to stop said continuous belt when receiving dough pieces, said withdrawing means being controlled to quickly withdraw said tip on approach of one of said fermentation trays in order to load said tray with a dough piece.

5. A plant in accordance with claim 2, wherein said rolling device is sequentially located after said prefermentation housing, and additionally comprising second conveyor belt means, third conveyor belt means and a second rolling device, said second conveyor belt means eminating from said roller device and comprising a plurality of separate belts of graduated lengths and ending above said third conveyor belt means disposed at an angle with respect thereto, said third conveyor belt means leading to said second rolling device.

6. A plant in accordance with claim 5, additionally comprising fourth conveyor belt means and delivery belt means, said fourth conveyor belt means connecting between said second rolling device and said delivery belt means, said fourth conveyor belt means ending above said delivery belt means for transfer of dough pieces thereto, said delivery belt means delivering said dough pieces to said final fermentation housing.

7. A plant in accordance with claim 6, wherein said plurality of separate belts of graduated lengths end at a height above said third conveyor belt means such that the conveyed dough pieces are turned over in transfer therebetween, and wherein said fourth conveyor belt means ends at a height above said delivery belt means such that the conveyed dough pieces are turned over in transfer therebetween.

8. A plant in accordance with claim 3, wherein said rolling device is sequentially located after said prefermentation housing, and additionally comprising second conveyor belt means, third conveyor belt means and a second rolling device, said second conveyor belt means eminating from said roller device and comprising a plurality of separate belts of graduated lengths and ending above said third conveyor belt means disposed at an angle with respect thereto, said third conveyor belt means leading to said second rolling device.

9. A plant in accordance with claim 8, additionally comprising fourth conveyor belt means and delivery belt means, said fourth conveyor belt means connecting between said second rolling device and said delivery belt means, said fourth conveyor belt means ending above said delivery belt means for transfer of dough pieces thereto, said delivery belt means delivering said dough pieces to said final fermentation housing.

10. A plant in accordance with claim 9, wherein said plurality of separate belts of graduated lengths end at a height above said third conveyor belt means such that the conveyed dough pieces are turned over in transfer therebetween, and wherein said fourth conveyor belt means ends at a height above said delivery belt means such that the conveyed dough pieces are turned over in transfer therebetween.

11. A plant in accordance with claim 1, wherein said rolling device is sequentially located after said prefermentation housing, and additionally comprising second conveyor belt means, third conveyor belt means and a second rolling device, said second conveyor belt means eminating from said roller device and comprising a plurality of separate belts of graduated lengths and ending above said third conveyor belt means disposed at an angle with respect thereto, said third conveyor belt means leading to said second rolling device.

12. A plant in accordance with claim 11, additionally comprising fourth conveyor belt means and delivery belt means, said fourth conveyor belt means connecting between said second rolling device and said delivery belt means, said fourth conveyor belt means ending above said delivery belt means for transfer of dough pieces thereto, said delivery belt means delivering said dough pieces to said final fermentation housing.

13. A plant in accordance with claim 12, wherein said plurality of separate belts of graduated lengths end at a height above said third conveyor belt means such that the conveyed dough pieces are turned over in transfer therebetween, and wherein said fourth conveyor belt means ends at a height above said delivery belt means such that the conveyed dough pieces are turned over in transfer therebetween.

14. A plant in accordance with claim 1, additionally comprising a substantially cylindrical brush being adjustably positioned above said tongue-shaped tip and being adapted to rotate in the direction of transfer of said dough pieces.

15. A plant in accordance with claim 14, additionally comprising supply belt means and brush means, said transfer belt means ending a spaced distance from said supply belt means, said brush means comprising at least one row of brushes located between said transfer belt means and said supply belt means in adjustable contact with the underside of said dough pieces and oscillating transversly to the direction of movement of said dough pieces.

16. A plant in accordance with claim 14, additionally comprising supply belt means and brush means, said transfer belt means ending a spaced distance from said supply belt means, said brush means comprising a plurality of rows of brushes located between said transfer belt means and said supply belt means in adjustable contact with the underside of said dough pieces and moving transversly to the direction of movement of said dough pieces, at least one of said rows of brushes moving oppositely another of said rows of brushes.

17. A plant in accordance with claim 1, additionally comprising supply belt means and brush means, said transfer belt means ending a spaced distance from said supply belt means, said brush means comprising at least one row of brushes located between said transfer belt means and said supply belt means in adjustable contact with the underside of said dough pieces and oscillating transversly to the direction of movement of said dough pieces.

18. A plant in accordance with claim 1, additionally comprising supply belt means and brush means, said transfer belt means ending a spaced distance from said supply belt means, said brush means comprising a plurality of rows of brushes located between said transfer belt means and said supply belt means in adjustable contact with the underside of said dough pieces and and moving transversly to the direction of movement of said dough pieces, at least one of said rows of brushes moving oppositely another of said rows of brushes.

19. A plant in accordance with claim 1, additionally comprising drive means for driving said endless conveyor means, said endless conveyor means comprising endless conveyor chains, said drive means comprising a drive motor and pairs of drive sprockets connected to said drive motor, said drive sprockets engaging said endless conveyor chains at every half chainlength, whereby the chains are guided within said fermentation housing such that said pairs of drive sprockets are adjacent one another.

20. A plant for the automatic production of Arabic flat bread, comprising a dough portioning machine, a kneading arrangement for forming ball-like dough pieces, a preferementation housing, at least a rolling device for making substantially flat dough pieces, a final fermentation housing comprising carriers for supporting said dough pieces, and a baking oven, characterized in that the carriers are fermentation trays having an even surface and a continuous border, said fermentation trays being filled to the brim with bran and being suspended to freely swing in two directions from endless conveyor means that move through said fermentation housing in a serpentine path, said final fermentation housing further comprising a filling station comprising a bran depot and evening means, said bran depot having a funnel above said fermentation trays at the point of filling and said evening means comprising an evening bar sequentially located following said funnel for evening the bran in said fermentation trays, said funnel comprising portioning means controlled by the advance of said fermentation trays to dispense a predetermined quantity of bran for each of said fermentation trays.

21. A plant in accordance with claim 20, wherein said portioning means comprises a switch controlled by a cam driven by said endless conveyor means, the contour of said cam controlling the time and quantity of dispensing of bran.

* * * * *